United States Patent
Xu et al.

(10) Patent No.: US 10,154,483 B2
(45) Date of Patent: Dec. 11, 2018

(54) COVERAGE ENHANCEMENT TECHNIQUES FOR MACHINE TYPE COMMUNICATION DEVICES IN A WIRELESS NETWORK

(71) Applicant: QUALCOMM Incorporated, San Diego, CA (US)

(72) Inventors: Hao Xu, San Diego, CA (US); Tingfang Ji, San Diego, CA (US); Peter Gaal, San Diego, CA (US); Durga Prasad Malladi, San Diego, CA (US); Wanshi Chen, San Diego, CA (US); Yongbin Wei, San Diego, CA (US); Kiran Somasundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 771 days.

(21) Appl. No.: 13/832,880

(22) Filed: Mar. 15, 2013

(65) Prior Publication Data
US 2014/0071957 A1    Mar. 13, 2014

Related U.S. Application Data

(60) Provisional application No. 61/700,240, filed on Sep. 12, 2012.

(51) Int. Cl.
*H04J 3/00* (2006.01)
*H04W 72/04* (2009.01)
(Continued)

(52) U.S. Cl.
CPC ......... *H04W 72/0446* (2013.01); *H04W 4/00* (2013.01); *H04W 4/70* (2018.02);
(Continued)

(58) Field of Classification Search
CPC . H04W 52/0219; H04W 4/00; H04W 72/121; H04W 4/005; H04W 4/008;
(Continued)

(56) References Cited

U.S. PATENT DOCUMENTS

| 2008/0129466 A1 | 6/2008 | Ruy et al. |
| 2011/0235558 A1 | 9/2011 | Diachina et al. |

(Continued)

FOREIGN PATENT DOCUMENTS

| EP | 2282413 A2 | 2/2011 |
| JP | 2011035910 A | 2/2011 |

(Continued)

OTHER PUBLICATIONS

International Search Report and Written Opinion—PCT/US2013/058776—ISA/EPO—May 2, 2014.

(Continued)

*Primary Examiner* — Kan Yuen
(74) *Attorney, Agent, or Firm* — Patterson & Sheridan, LLP

(57) ABSTRACT

Certain aspects provide a method for wireless communications by a first access point, comprising determining a first schedule of intervals for the first access point to communicate with a first group of one or more wireless devices, wherein intervals of the first schedule are synchronized with wake up or transmission cycles of the first group of one or more wireless devices and communicating with the first group of one or more wireless devices according to the first schedule.

58 Claims, 8 Drawing Sheets

(51) Int. Cl.
*H04W 4/70* (2018.01)
*H04W 4/80* (2018.01)
*H04W 4/00* (2018.01)
*H04W 72/12* (2009.01)
*H04W 52/02* (2009.01)

(52) U.S. Cl.
CPC ......... *H04W 4/80* (2018.02); *H04W 52/0219* (2013.01); *H04W 72/121* (2013.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01)

(58) Field of Classification Search
CPC ..... H04W 72/0446; H04W 4/70; H04W 4/80; H04L 5/0094; H04L 5/0082; Y02B 60/50; Y02D 70/00; Y02D 70/1242; Y02D 70/1262; Y02D 70/1264; Y02D 70/142; Y02D 70/146; Y02D 70/21
USPC .......... 370/311, 329, 336; 455/433; 709/226
See application file for complete search history.

(56) References Cited

U.S. PATENT DOCUMENTS

| | | | |
|---|---|---|---|
| 2011/0264740 A1 | 10/2011 | Diachina et al. | |
| 2011/0274040 A1 | 11/2011 | Pani et al. | |
| 2011/0310854 A1 | 12/2011 | Zou et al. | |
| 2012/0064932 A1 | 3/2012 | Lim et al. | |
| 2012/0307774 A1 | 12/2012 | Zhao et al. | |
| 2013/0182623 A1* | 7/2013 | Fan et al. | 370/311 |
| 2013/0223416 A1* | 8/2013 | Michel | 370/336 |
| 2013/0242825 A1* | 9/2013 | Farhadi et al. | 370/311 |
| 2013/0329576 A1* | 12/2013 | Sinha | H04W 52/0229 370/252 |
| 2014/0099949 A1* | 4/2014 | Godor | H04W 52/0206 455/434 |

FOREIGN PATENT DOCUMENTS

| | | |
|---|---|---|
| TW | 463510 B | 11/2001 |
| TW | 579634 B | 3/2004 |
| TW | I302793 B | 11/2008 |
| TW | I327842 B | 7/2010 |
| WO | WO-03096580 A2 | 11/2003 |
| WO | WO-2010073403 A1 | 7/2010 |
| WO | WO-2010125738 A1 | 11/2010 |
| WO | WO-2011052037 A1 | 5/2011 |
| WO | WO-2012041363 A1 | 4/2012 |

OTHER PUBLICATIONS

Chao Hua et al., "Power saving for Machine to Machine communications in cellular networks", Globecom Workshops (GC WKSHPS), 2011, Dec. 5, 2011, pp. 389-393, IEEE, XP032124615, DOI: 10.1109/GLOCOMW.2011.6162477, ISBN: 978-1-4673-0039-1.

Taiwan Search Report—TW102132629—TIPO—dated Jun. 3, 2015.

CATT: "Paging and Downlink Transmission for MTC", 3GPP TSG RAN WG2 Meeting #70, R2-102781, May 4, 2010, pp. 1-3, URL: http://www.3gpp.org/ftp/tsg_ran/WG2_RL2/TSGR2_70/Docs/R2-102781.zip.

ITRI: "Further Considerations on EAB", 3GPP TSG-RAN WG2#78 R2-122666, May 15, 2012, 3 Pages.

NEC Group: "Maximum Bandwidth Reduction for Low-Cost MTC UE based on LTE", 3GPP Draft; R1-120259, 3rd Generation Partnership Project (3GPP), Mobile Competence Centre, 650, Route Des Lucioles, F-06921 Sophia-Antipolis Cedex, France, vol. RAN WG1, No. Dresden, Germany, 20120206-20120210, Jan. 31, 2012 (Jan. 31, 2012), 6 Pages, XP050562813, title section 2.2 Bandwidth sharing.

Panasonic: "Potential Standardization Impact of Uplink CoMP", 3GPP TSG-RAN WG1#66b, R1-113126, Oct. 4, 2011, pp. 1-2, URL: http://www.3gpp.org/ftp/tsg_ran/WG1_RL1/TSGR1_66b/Docs/R1-113126.zip.

Qualcomm Incorporated: "DM-RS Enhancements in Support of Uplink CoMP", 3GPP TSG-RAN WG1#69 R1-122786, May 12, 2012, pp. 1-4.

* cited by examiner

COVERAGE ENHANCEMENT TECHNIQUES FOR MACHINE TYPE COMMUNICATION DEVICES IN A WIRELESS NETWORK

CROSS-REFERENCE TO RELATED APPLICATIONS

This application claims benefit of U.S. Provisional Patent Application Ser. No. 61/700,240, filed Sep. 12, 2012, which is incorporated by reference herein in its entirety.

BACKGROUND

I. Field

Certain aspects of the present disclosure generally relate to wireless communications and, more particularly, to methods for enhancing coverage for machine type communication (MTC) devices in a wireless network.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, laptop computers, tablets, netbooks, smartbooks, ultrabooks, etc. A remote device is a device that operates without being directly controlled by humans. Some examples of remote devices include sensors, meters, monitors, location tags, etc. A remote device may communicate with a base station, another remote device, or some other entity. Machine type communication (MTC) refers to communication involving at least one remote device on at least one end of the communication.

SUMMARY

Certain aspects of the present disclosure provide a method for wireless communications by a first access point. The method generally includes determining a first schedule of intervals for the first access point to communicate with a first group of one or more wireless devices, wherein intervals of the first schedule are synchronized with wake up or transmission cycles of the first group of one or more wireless devices and communicating with the first group of one or more wireless devices according to the first schedule.

Certain aspects of the present disclosure provide an apparatus for wireless communications by a first access point. The apparatus generally includes means for determining a first schedule of intervals for the first access point to communicate with a first group of one or more wireless devices, wherein intervals of the first schedule are synchronized with wake up or transmission cycles of the first group of one or more wireless devices, and means for communicating with the first group of one or more wireless devices according to the first schedule.

Certain aspects of the present disclosure provide an apparatus for wireless communications by a first access point. The apparatus generally includes at least one processor and a memory coupled to the at least one processor. The at least one processor is generally configured to determine a first schedule of intervals for the first access point to communicate with a first group of one or more wireless devices, wherein intervals of the first schedule are synchronized with wake up or transmission cycles of the first group of one or more wireless devices, and communicate with the first group of one or more wireless devices according to the first schedule.

Certain aspects of the present disclosure provide a computer-program product for wireless communications by a first access point. The computer-program product generally includes a computer-readable medium having code for determining a first schedule of intervals for the first access point to communicate with a first group of one or more wireless devices, wherein intervals of the first schedule are synchronized with wake up or transmission cycles of the first group of one or more wireless devices, and communicating with the first group of one or more wireless devices according to the first schedule.

DETAILED DESCRIPTION

Certain aspects of the present disclosure generally relate to wireless communications and, more particularly, to methods for enhancing coverage for machine type communication (MTC) devices in a wireless network. Certain aspects of the present disclosure provide techniques for making available an extra link budget (e.g., 20 dB) for both DL (downlink) and UL (uplink) signals and keeping power consumption low by synchronizing wake up and transmission cycles of multiple wireless devices.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described for LTE/LTE-Advanced (collectively referred to as "LTE"), and LTE terminology is used in much of the description below. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
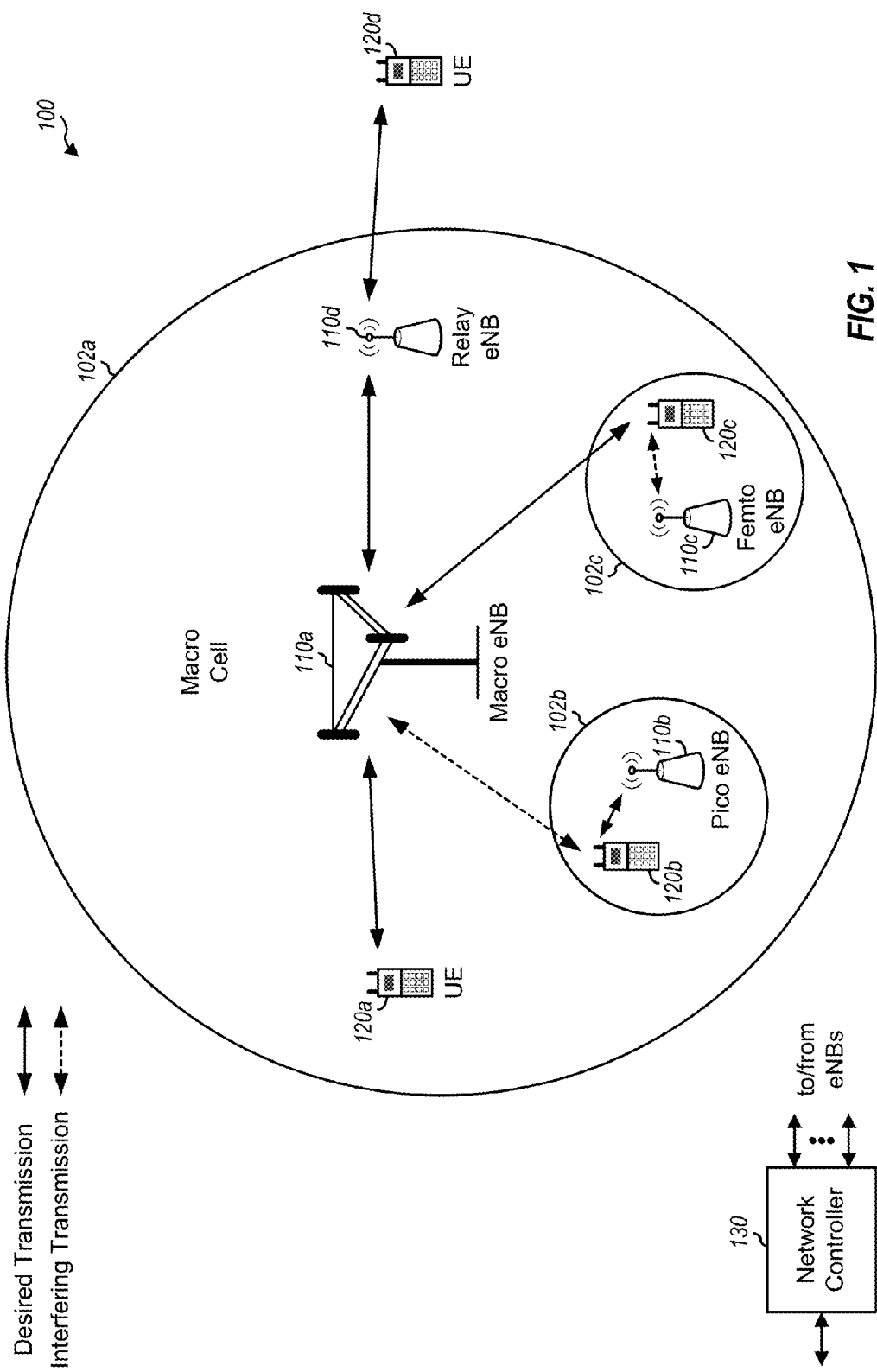
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. In some configurations, a UE may serve as an eNB. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul. Solid double-arrow lines indicate desired transmission and dashed double-arrow lines indicate interfering transmission.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, a ultrabook, etc.

Figure 2:
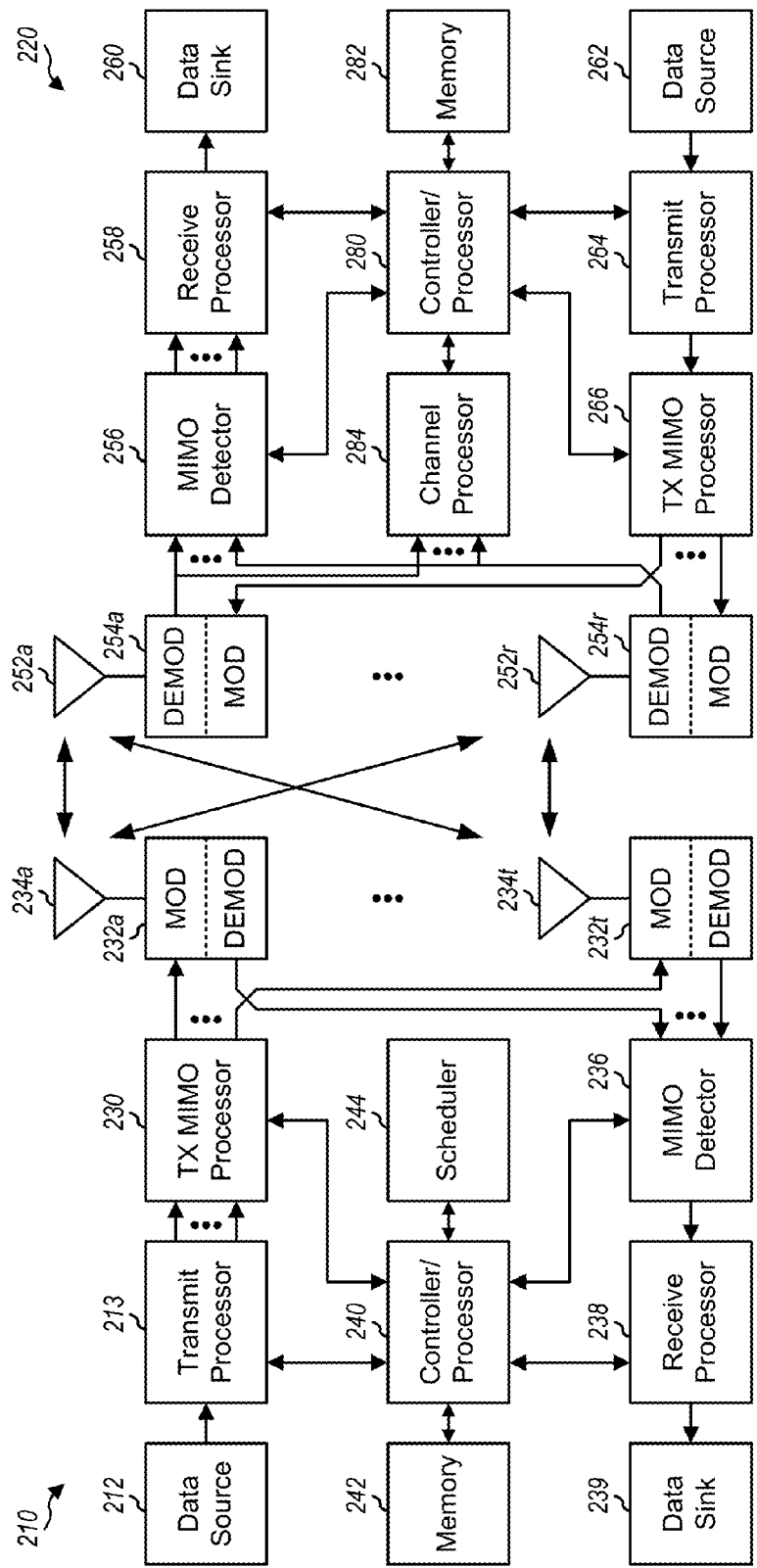
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 210 and UE 220, which may be one of the base stations/eNBs and one of the UEs in FIG. 1. Base station 210 may be equipped with T antennas 234a through 234t, and UE 220 may be equipped with R antennas 252a through 252r, where in general T≥1 and R≥1.

At base station 210, a transmit processor 213 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 220, antennas 252a through 252r may receive the downlink signals from base station 210 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 220 to a data sink 260, and provide decoded control information and system information to a controller/processor 280. A channel processor may determine RSRP (Reference Signal Received Power), RSSI (Received Signal Strength Indicator), RSRQ (Reference Signal Received Quality), CQI (Channel Quality Indicator), etc.

On the uplink, at UE 220, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 210. At base station 210, the uplink signals from UE 220 and other UEs may be received by antennas 234, processed by demodulators 232, detected by a MIMO detector 236 if applicable, and further processed by a receive processor 238 to obtain decoded data and control information sent by UE 220. Processor 238 may provide the decoded data to a data sink 239 and the decoded control information to controller/processor 240. Base station 210 may include scheduler 244 and a communication unit (not shown), and communicate to network controller 130 via the communication unit. Network controller 130 may include a communication unit, a controller/processor, and memory.

Controllers/processors 240 and 280 may direct the operation at base station 210 and UE 220, respectively. Processor 240 and/or other processors and modules at base station 210, and/or processor 280 and/or other processors and modules at UE 220, may perform or direct processes for the techniques described herein. Memories 242 and 282 may store data and program codes for base station 210 and UE 220, respectively. A scheduler 244 may schedule UEs for data transmission on the downlink and/or uplink.

As will be described in further detail below, when transmitting data to the UE 220 the base station 210 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 220 may be configured to perform complementary processing to decode data transmitted from the base station 210. For example, the UE 220 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
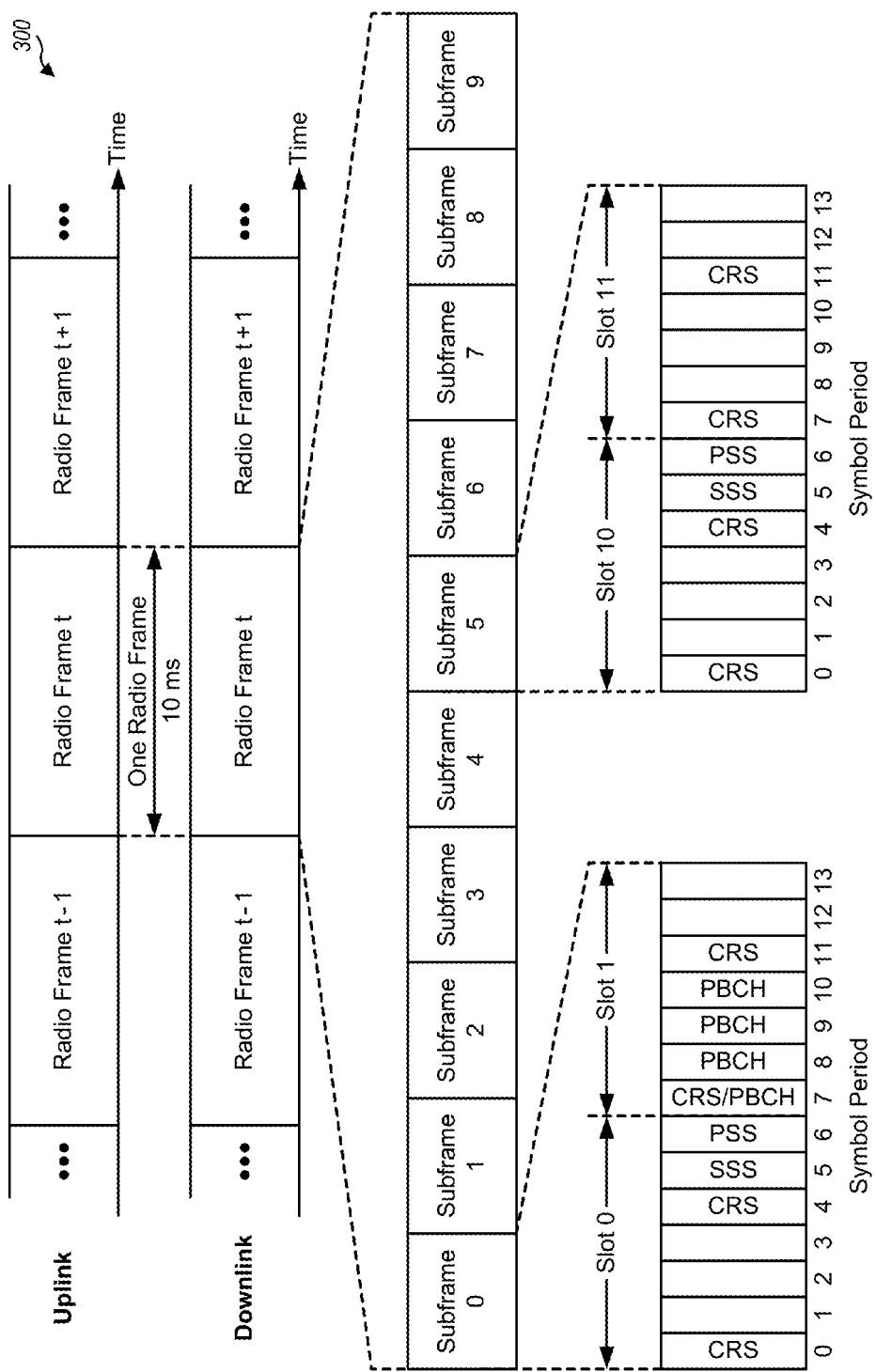
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

A focus of conventional Long Term Evolution design relates to the improvement of spectral efficiency, ubiquitous coverage, and enhanced quality of service (QoS) support. These improvements may result in high end devices, such as state-of-art smartphones and tablets. However, low cost low rate devices need to be supported as well. For example, some market projections show that the number of low cost devices may largely exceed the number cell phones. Considerations regarding the provision of low-cost machine type communications (MTC) may include reduction of maximum bandwidth, single receive radio-frequency (RF) chain, reduction of peak rate, reduction of transmit power, and half duplex operations.

Primary synchronization signal/second synchronization signal (PSS/SSS) may be transmitted to signal any of the 504 unique physical cell IDs. PSS selects from three length-63 Chu sequences (e.g., root index 25,29,34). SSS may be concatenated from two length-31 binary sequences to convey 168 cell ID groups. Master information block (MIB) or physical broadcast channel (PBCH) may contain bandwidth information (e.g., 4 bits may not be needed for MTC since narrowband operation will be used). For example, MIB or PBCH may contain information about physical HARQ indicator channel (PHICH) configuration (e.g., 3 bits; 1 bit for duration, 2 bits for PHICH group). Information about PHICH configuration may not be needed for new carrier type (NCT) or for fixed control region for PBCH subframe). MIB or PBCH may contain information regarding system frame number (SFN) (e.g., 8 bits of most significant bit (MSB); the other 2 bits from blind decoding of PBCH in 40 ms). SFN may be signaled later in the payload. MIB or PBCH may contain information regarding antenna information (e.g., may be conveyed by other signal). PBCH transmission may match around 4 antenna ports. Space frequency block codes (SFBC) or SFBC frequency switched transmit diversity (SFBC-FSTD) may be used for antenna numbers of 2 or 4. Combined with 4 timing hypothesis and 3 antenna hypothesis, a total of 12 blind decoding may be needed for current PBCH decoding.

Paging a UE may occur in RRC_idle state. Paging may inform a UE in idle and connected states about system information (SI) changes. In addition, paging may inform about earthquake and tsunami warning system (ETWS) notification or commercial mobile alert service (CMAS) notification. One paging frame may be one radio frame. For frequency division duplex (FDD), the paging occasion may be: [9] or [4,9] or [0,4,5,9]. For time division duplex (TDD), the paging occasion may be: [0] or [0,5] or [0,1,5,6]. Paging radio network temporary identifier (P-RNTI) is used to scramble physical downlink control channel (PDCCH) to indicate paging. E-UTRAN may address multiple UEs within a paging message by including one paging record for each UE (e.g., using UE-identity). Paging responses generally include radio resource control (RRC) connect, system information block (SIB) update, or re-acquire SIB for ETWS/CMAS.

In LTE, a multimedia broadcast multicast service (MBMS) may be provided in a multimedia broadcast service single frequency network (SFN). In other words, by SFN, the same signal may be transmitted from multiple nodes. Control information for MBMS may be provided in a logical channel specific for MBMS common control information (MCCH). The MBSFNAreaConfiguration message may be carried in MCCH for radio resources. The MBMSCountingRequest message may be carried on MCCH to count the number of UEs in a RRC_Connected state that are receiving or willing to receive MBMS. The MCCH may be carried in SIB13 specifically for MBMS. Multicast channel (MCH) scheduling information medium access control (MAC) element may be included in the first subframe of MCH in a scheduling period. Subframes for MBSFN may be configured with a bitmap along with radio frame periodicity/offset (e.g., FDD: 1, 2, 3, 6, 7, 8 and TDD: 3, 4, 7, 8, 9). An MBSFN reference signal may be transmitted in MBSFN subframes only if physical multicast channel (PMCH) is transmitted. Change notification is carried by downlink control information (DCI) format 1C in common search space with multicast RNTI.

There is a need for link budget improvement, for example, of up to 20 dB, for MTC devices, particularly MTC devices with reduced coverage (e.g., deployed in a basement). Certain aspects of the present disclosure provide techniques for making available an extra link budget (e.g., 20 dB) for both DL and UL signals, while maintaining low power consumption. Aspects of the present disclosure provide network densification techniques for ensuring that nodes may be quickly identified by the MTC devices. In a HetNet (heterogeneous network) deployment, aspects of the present disclosure also provide techniques for associating with the best DL and best UL (e.g., the closest node).

Figure 4:
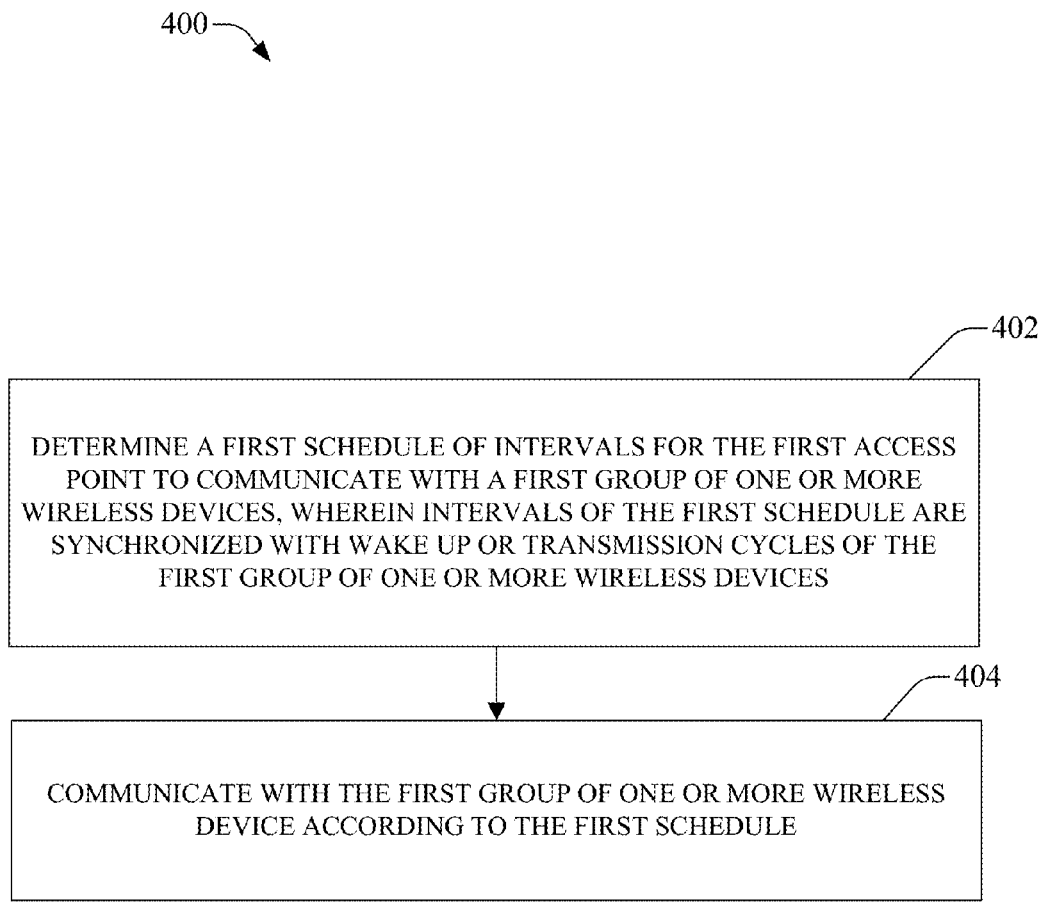
FIG. 4 illustrates example operations for enhancing coverage for MTC devices in a wireless network, in accordance with certain aspects of the present disclosure.

FIG. 4 illustrates example operations 400 for enhancing coverage for MTC devices in a wireless network (e.g., LTE), in accordance with certain aspects of the present disclosure. The operations 400 may be performed, for example, by a first access point (base station). At 402, the first access point may determine a first schedule of intervals (e.g., corresponding to subframes) for the first access point to communicate with a first group of one or more wireless devices, wherein intervals of the first schedule are synchronized with wake up or transmission cycles of the first group of one or more wireless devices. At 404, the first access point may communicate with the first group of one or more wireless devices according to the first schedule.

For certain aspects, the first access point may be part of a first group of one or more access points that communicate with the first group of wireless devices according to the first schedule, and a second group of one or more access points may communicate with a second group of wireless devices according to a second schedule of intervals. The intervals of the first and second schedules may be non-overlapping.

For certain aspects, the first access point may be part of a first group of one or more access points that communicate with the first group of wireless devices according to the first schedule, and a second group of one or more access points may communicate with the first group of wireless devices according to a second schedule of intervals, different than the first schedule.

For certain aspects, the first access point may be part of a first group of access points that communicate with the first group of wireless devices according to the first schedule, and communicate with a second group of wireless devices according to a second schedule of intervals, different than the first schedule. The first group of wireless devices generally includes MTC devices and the second group of wireless devices generally includes non-MTC devices.

Figure 5:
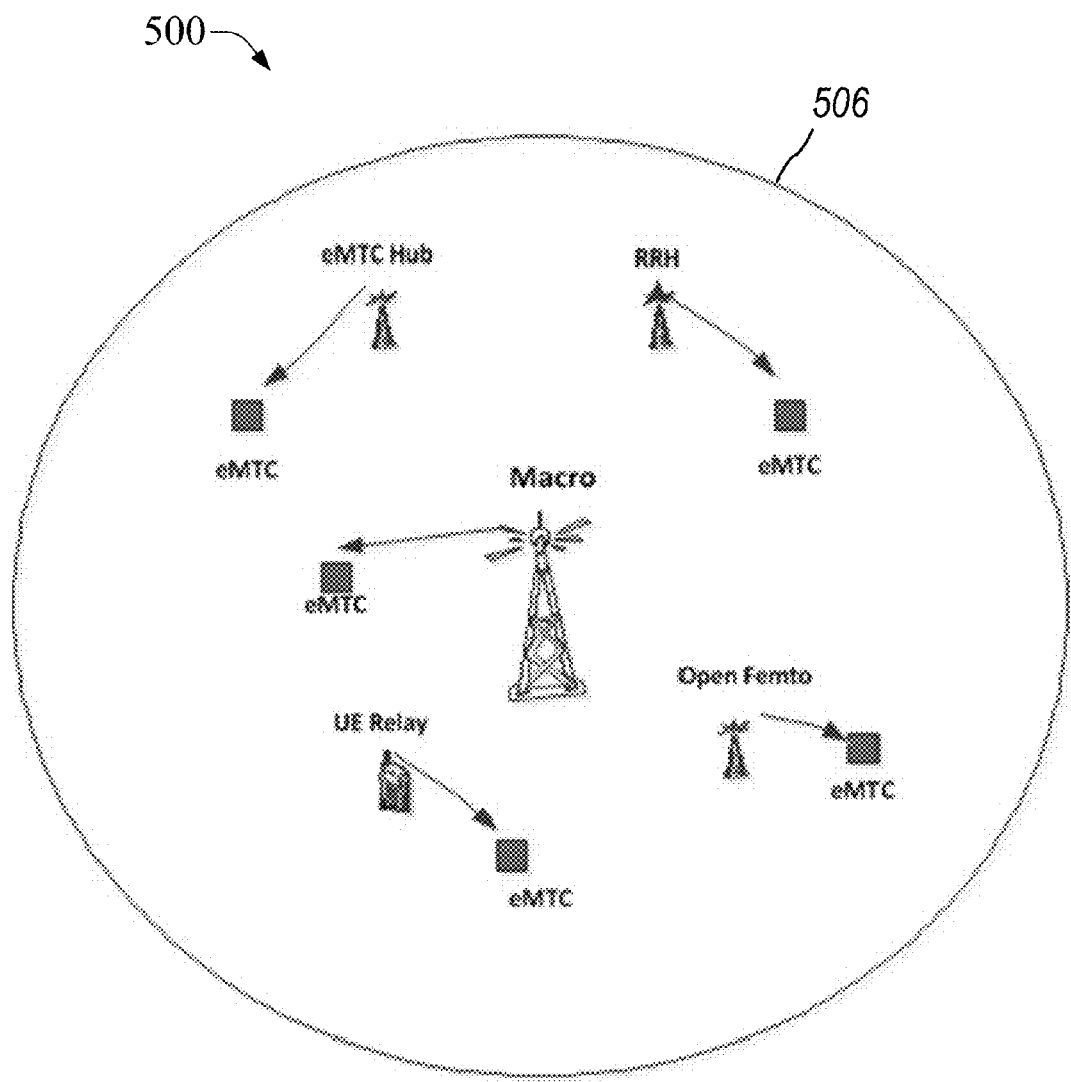
FIG. 5 illustrates a tiered architecture that includes a hyper dense deployment of base stations (BSs) for MTC devices, in accordance with certain aspects of the present disclosure.

FIG. 5 illustrates a tiered architecture 500 that includes a dense deployment of base stations (BSs) for MTC devices, in accordance with certain aspects of the present disclosure. The tiered architecture 500 may include the Macro node and an enhanced MTC device (eMTC) in a first tier. The second tier generally includes low power nodes (LPNs) such as user equipment (UE) relays, pico BSs, open femto BSs, remote radio heads (RRHs), and MTC/eMTC hubs within a coverage area 506. The deployment of these BSs for the eMTC devices may reduce link budget requirements, reduce power consumption, and reduce device cost.

Figure 6A:
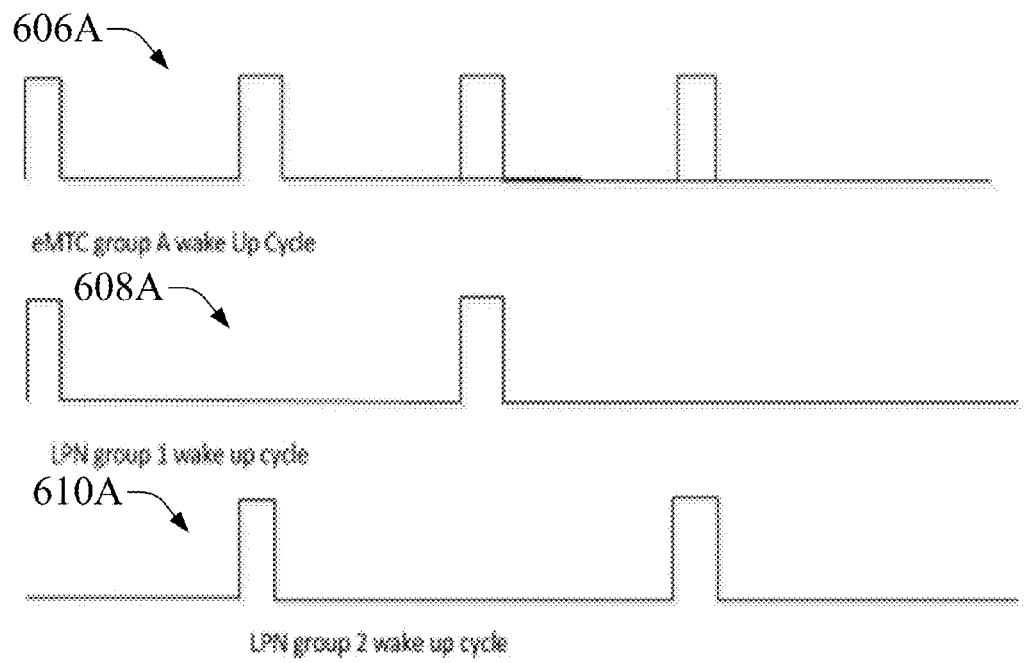
FIGS. 6A-B illustrate synchronization operations, in accordance with certain aspects of the present disclosure.
Figure 6B:
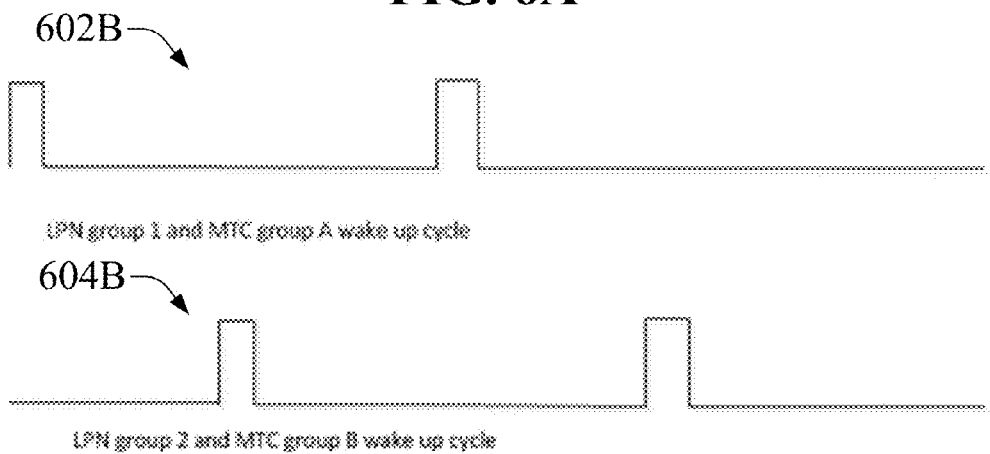

FIGS. 6A-B illustrate synchronization operations, in accordance with certain aspects of the present disclosure. Groups of MTC devices may be scheduled to wake up at certain intervals, and LPNs may be matched to these intervals. For certain aspects, LPN groups may be mapped 1 to 1 to MTC groups, as illustrated in FIG. 6B, where, for example, LPN group 1 and MTC group A may have a first wake up cycle 602B and LPN group 2 and MTC group B (not shown) may have a second wake up cycle 604B. In other words, each MTC group may have an associated group of LPNs that wake up according to a schedule to communicate with each other.

For certain aspects, there may be M to 1 or 1 to M mapping between the LPN and MTC groups, as illustrated in FIG. 6A, where, for example, MTC group A may have both a wake up cycle 606A corresponding to a first wake up cycle with LPN group 1 608A and a second wake up cycle with LPN group 2 610A. In other words, LPN group 1 may wake up to communicate with MTC group A during certain intervals that MTC group A is awake, and LPN group 2 may wake up to communicate with MTC group A during other intervals that MTC group A is awake. In addition, multiple MTC groups may be associated with a single LPN group. For certain aspects, when an MTC group wakes up, the associated LPN group may already be transmitting to minimize initiation delay and power consumption.

For certain aspects, an LPN group may wake up according to a first schedule to communicate with MTC devices, and according to a second schedule, different than the first schedule, to communicate with non-MTC devices. With the synchronized transmission for MTC, the LPNs may transmit signals specifically targeted to the MTC devices. However, the LPNs may be always "awake", but transmitting different signals at different times. For example, in MTC subframes (e.g., intervals of the first schedule), the LPNs may transmit special PSS/SSS/PBCH signals for MTC devices (e.g., new synchronization signals, broadcast signals, cell discovery signals, special CSI-RS signals). In MTC subframes, the density of the transmitted signal may be increased, so that the MTC devices may perform operations such as cell acquisition and tracking loop more rapidly to allow energy saving or to provide better coverage. In the other subframes (e.g., intervals of the second schedule), regular PSS/SSS/PBCH signals may be transmitted.

Link budget for LTE is typically UL limited because the transmit power from UE is typically significantly lower that from eNB. Because there may be a significantly lower transmit power from neighboring BSs (e.g., LPNs) compared with the macro BS (e.g., eNB) transmit power, macro cell dominates DL coverage. For HetNet with a macro BS and LPNs, even with a large number of LPNs, the macro BS may still have significant coverage due to the large power difference in the DL. Therefore, an MTC device may associate UL transmissions with the macro BS, although there may be a closer LPN available. Therefore, aspects of the present disclosure provide techniques for performing UL association to the closest LPNs. Alternatively, for certain aspects, all UL cells may receive the information from the UE. In other words, if one MTC transmits, all surrounding LPNs may try to receive its signal and try to jointly decode/combine.

Reducing the transmission power of a macro BS during MTC subframes may allow closest cell discovery by an MTC device. In other words, by reducing transmit power from the macro BS, the MTC device may be able to associate with the "closest" nodes with the least path loss.

For a single carrier, the macro BS may transmit less power on MTC subframes with different PSS/SSS/PBCH to allow MTC devices to detect the closest BS. In other subframes, the macro BS may operate at its normal power. For Release 11 and beyond UEs, the macro BS may advertise MTC subframes as restricted subframes, as in eICIC (Enhanced Inter-Cell Interference Coordination). For legacy UEs, the macro BS may advertise the MTC subframe as MBSFN subframes, where the macro BS may transmit the CRS at the same high level. MTC devices may ignore this high power CRS for cell association purpose. For neighbor macro BSs, some coordination required. For example, a minimal of one interlace may be reserved for reduced/zero-power for MTC subframes, although the number of subframes (interlaces) per macro BS may be different.

For multiple carriers, the macro BS may transmit at normal power on the first carrier (f1), and at a reduced power (e.g., similar level as LPNs) on the second carrier (f2) at least for the MTC subframes, so MTC devices may detect the best cell from an UL perspective.

Figure 7:
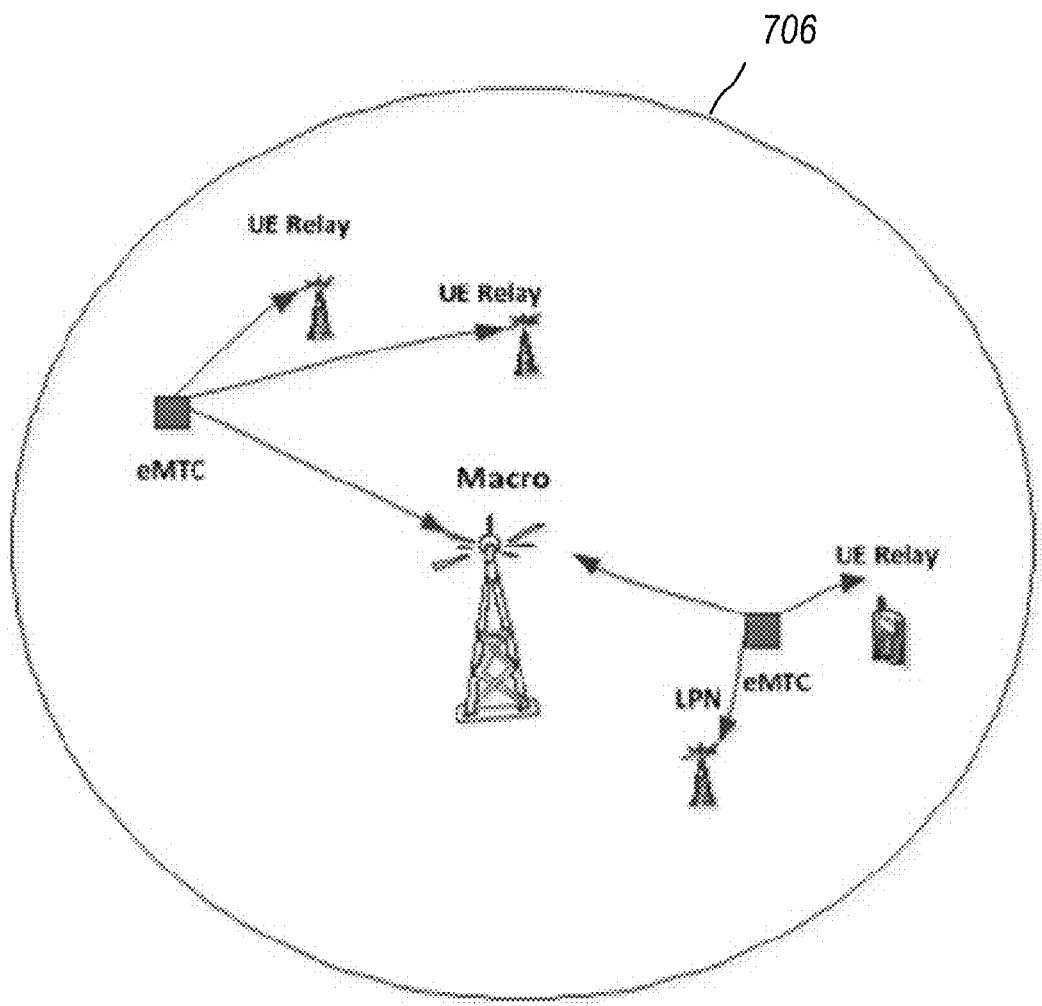
FIG. 7 illustrates a joint uplink reception by a macro BS and multiple low power nodes (LPNs), in accordance with certain aspects of the present disclosure.

FIG. 7 illustrates a joint uplink reception by a macro BS and multiple LPNs in an SFN area 706, in accordance with certain aspects of the present disclosure. The macro BS and the LPNs may exchange scheduling information (e.g., X2 support required). As a result, an MTC device transmission may be processed by surrounding LPNs and/or the macro BS, as illustrated in FIG. 7. Different MTC transmissions may be orthogonalized in time, frequency, or geolocation. For certain aspects, the MTC device may be signaled a virtual cell ID for UL configuration and transmissions. The virtual cell ID may be mapped to the group of LPNs for reception.

For certain aspects, for downlink transmissions, the same signal may be transmitted from multiple LPNs (e.g., single frequency network (SFN) transmission). For example, the LPNs may transmit SFN transmissions for the MTC subframes. PSS/SSS/PBCH/Paging/SIB may be specially designed for MTC. The signals may be transmitted SFN from the groups of the macro and the LPNs to the target MTC groups. Different SFN areas may target different degrees of broadcasting messages. Different subframes may be used for SFN transmissions with the different SFN areas. As an example, subframe 1 may include multiple macro cell areas for SFN, and subframe 2 may include one macro cell area for SFN. For certain aspects, there may be different paging areas to target different groups of users. The same SFN may be applied to all other DL signal/channels as well. As a result, there may be a significant reduction of the DL noise and interference, energy combining from all DL transmission nodes to the MTC. SFN transmissions may be suitable for software/firmware (SW/FW) updates where broadcasted information is needed. In addition, SFN transmissions may also be used for unicast to significantly improve coverage.

Figure 8:
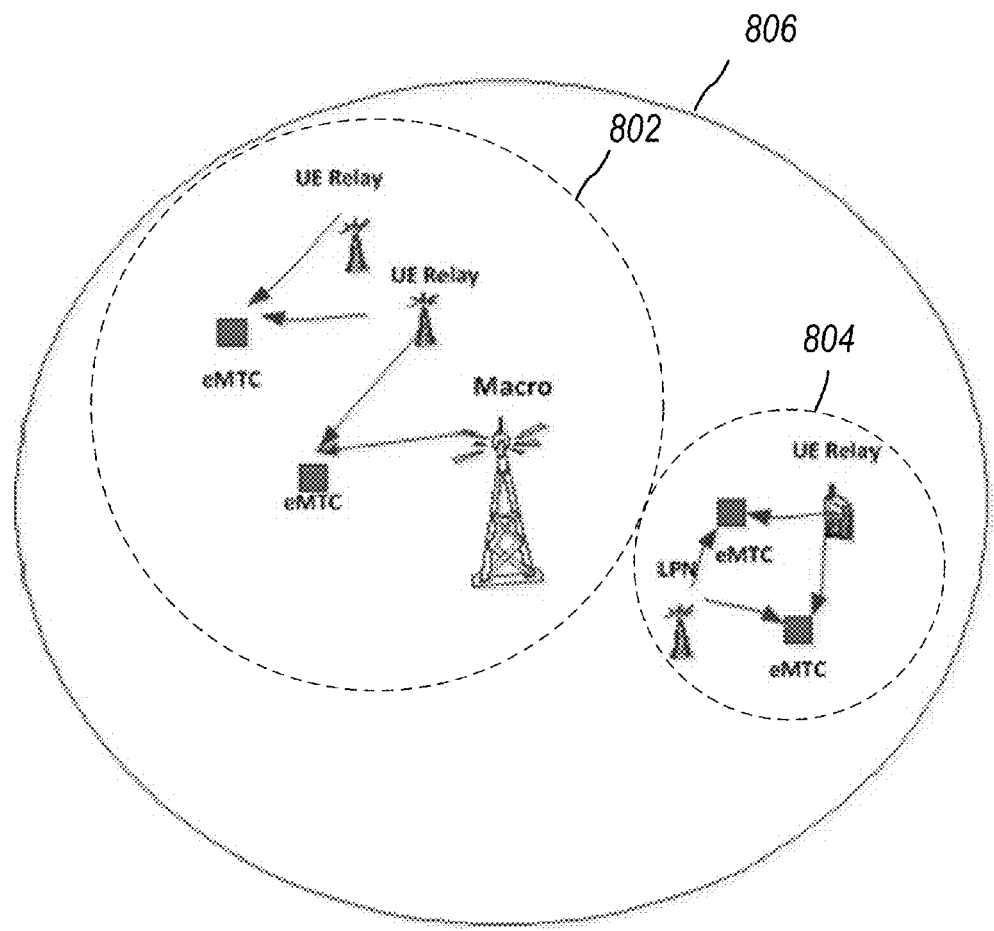
FIG. 8 illustrates single frequency network (SFN) transmissions for different SFN areas, in accordance with certain aspects of the present disclosure.

FIG. 8 illustrates SFN transmissions for different SFN areas, in accordance with certain aspects of the present disclosure. As mentioned above, different SFN areas may target different degrees of broadcasting messages. Controlled by a macro base station, a local SFN area 802 may be formed for the downlink transmission for the MTC areas. SFN area 804 is another example of a local SFN area for transmitting, for example, unicast messages. For certain aspects, SFN areas 802 and 804 may be grouped to form a larger area for SFN transmissions 806 for transmitting broadcast messages such as SW/FW. In other words, the macro BS and LPNs from SFN areas 802 and 804 may transmit the broadcast messages to MTC devices.

In order to have coexistence with regular UEs, such as legacy UEs, the legacy UEs may be signaled MBSFN subframes for the MTC subframes. Legacy common reference signals (CRS) may be transmitted in the first symbol, so that legacy UEs are not affected. Because the synchronization signal and other necessary broadcast and SI information are new for MTC devices, they may be transparent to legacy UEs. For certain aspects, the MTC subframes may be a subset of the MBSFN subframes. For Release 11 UEs, they be signaled as restricted subframes for the MTC subframes, then there may be no need to transmit legacy signals in these subframes. For Release 12 and beyond, a regular UE may also be signaled about the MTC subframe, where MTC signals and channels may be specified. In the case that a UE is signaled both MTC and MBSFN subframes, priority rules may be introduced to have MTC or MBSFN take precedence.

An MTC device may perform a cell search based on the new PSS/SSS/PBCH/SIB or new cell identification signal. The fact that these signals are transmitted in SFN from different nodes may be transparent to the MTC devices. There may be a standard specification on which legacy signals are transmitted on these MTC subframes (e.g., CRS in first symbol, the MTC signals can rate match around these signals). In case SFN is introduced for DL transmission, paging to the MTC UE may be based on different SFN areas. Paging for broadcasting information such as SW/FW updates may be sent to a large number of MTC devices in a larger SFN region. DL data may also be broadcasted in the larger area in SFN. Paging for unicast may be sent with a smaller SFN area, where different UE's unicast traffic is FDM (frequency division multiplexing) and/or TDM (time division multiplexing).

Paging subframe and MBSFN subframes may be different for regular UEs. For MTC, the paging subframes may be changed to a subset or whole set of the MTC subframes. For the case where MTC subframes are a subset of the total signaled MBSFN subframes, paging locations may need to be changed to be a subset of MBSFN subframes as well. For certain aspects, the paging may link to MTC system information (SI) changes instead of a regular UE's SI changes. Therefore, there may be separate SI updates from regular UEs. Paging for ETWS/CMAS as well as the required response from MTC devices may be different from regular UEs and may also be different from different MTC devices.

For certain aspects, a group of BSs may communicate with non-MTC devices using a set of channels, and communicate with MTC devices using a reduced subset of the set of channels. For example, certain channels, with regards to MTC devices, may be unnecessary and, therefore, removed. Examples of such channels include PHICH, PUCCH, and PCFICH. PHICH and PUCCH may be removed due to HARQ-less operation and no report of CQI. In addition, there may be no need to use PCFICH, fixed starting point of PDSCH broadcasted to all MTC UEs. Remaining channels/signals may be enhanced, such as PSS/SSS/PBCH (e.g., larger average and acquisition time, increased density such as bundling), SIB/Paging (e.g., reduced payload, bundling, larger averaging and acquisition time), PDCCH (e.g., large aggregation, TTI bundling, SPS), and PDSCH/PUSCH (e.g., UL TTI bundling, DL TTI bundling). For certain aspects, in order to meet 20 dB additional link budget requirements, all of the channels may need further link budget improvement.

PSS may have three different sequences and SSS may have 171 different sequences. Together, PSS and SSS may identify 511 physical cell identities (PCI). For 20 dB coverage enhancements, the sequences may be left as they are, and MTC devices may rely on a long average to gain link budget. As another example, there may be a new PSS/SSS/PBCH design with much larger processing gain (e.g., repetition, bundling or code rate reduction). As another example, for NCT with sparse signal or dormant mode, there may be denser PSS/SSS/PBCH during wake up. As another example, a new PSS/SSS may convey restrict PCI (for densification), or multiple set, or different sequence for virtual PCI.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware and/or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in combinations thereof. A software/firmware module may reside in RAM memory, phase-change memory, flash memory, ROM memory, EPROM memory, EEPROM memory, PCM (phase change memory), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a first low power node (LPN), comprising:
   determining a first schedule of intervals for the first LPN to communicate with a first group of one or more wireless machine type communication (MTC) devices, wherein intervals of the first schedule are synchronized with wake up cycles of the first group of one or more wireless MTC devices;
   communicating with the first group of one or more wireless MTC devices according to the first schedule, wherein the first LPN communicates using a lower transmit power than a transmit power used by a macro base station (BS); and
   entering a low power mode or communicating with a second group of one or more wireless non-MTC devices between the intervals.

2. The method of claim 1, wherein intervals of the first schedule correspond to subframes.

3. The method of claim 2, wherein a subset of the intervals of the first schedule correspond to subframes used for paging.

4. The method of claim 3, wherein:
   the paging is used to convey MTC system information (SI) changes, wherein the MTC SI changes are different from wireless non-MTC SI changes.

5. The method of claim 4, wherein responses from a first class of wireless MTC devices for paging for earthquake and tsunami warning system/commercial mobile alert system (ETWS/CMAS) are different from responses from a second class of wireless MTC devices and wireless non-MTC devices.

6. The method of claim 1, wherein:
   the first LPN is part of a first group of one or more LPNs that communicates with the first group of one or more wireless MTC devices according to the first schedule; and
   a second group of one or more LPNs communicates with a second group of wireless MTC devices according to a second schedule of intervals, wherein intervals of the second schedule are synchronized with wake up cycles of the second group of one or more wireless MTC devices.

7. The method of claim 6, wherein intervals of the first schedule and the second schedule are non-overlapping.

8. The method of claim 1, wherein:
   the first LPN is part of a first group of one or more LPNs that communicates with the first group of one or more wireless MTC devices according to the first schedule; and
   a second group of one or more LPNs communicates with the first group of one or more wireless MTC devices according to a second schedule of intervals, different than the first schedule, wherein intervals of the second schedule are synchronized with other wake up cycles of the first group of one or more wireless MTC devices.

9. The method of claim 1, wherein the first LPN is part of a first group of LPNs that:
   communicates with the first group of one or more wireless MTC devices according to the first schedule; and
   communicates with the second group of one or more wireless MTC devices according to a second schedule of intervals, different than the first schedule.

10. The method of claim 1, wherein the first group of LPNs:
    communicates with the wireless non-MTC devices using a set of channels; and
    communicates with the wireless MTC devices using a subset of the set of channels.

11. The method of claim 10, wherein:
    at least one of a primary synchronization sequence (PSS), a secondary synchronization sequence (SSS), a physical broadcast channel (PBCH), a system information block (SIB), or paging associated with the wireless MTC devices has a larger acquisition time than for wireless non-MTC devices.

12. The method of claim 11, wherein the at least one of a PSS, a SSS, a PBCH, or a SIB is transmitted on subframes allocated for communicating with the wireless MTC devices.

13. The method of claim 12, wherein the at least one of a PSS, a SSS, a PBCH, or a SIB is transmitted using at least one of: different time, different frequency, different sequence, different format, different scrambling, different payload size, or different content than that used to transmit the same type of signal to wireless non-MTC devices.

14. The method of claim 11, wherein the at least one of a PSS, a SSS, a PBCH, or a SIB has higher density on subframes allocated for communicating with the wireless MTC devices than for subframes allocated for communicating with wireless non-MTC devices.

15. The method of claim 14, wherein the higher density is a result of at least one of repetition, bundling, or lower code rate.

16. The method of claim 1, wherein:
the first LPN comprises a user equipment (UE) relay, a pico cell, an open femto cell, a remote radio head (RRH), or an MTC hub.

17. The method of claim 1, wherein:
the first LPN is part of a group of LPNs that communicates with the first group of one or more wireless MTC devices according to the first schedule; and
at least one LPN in the group communicates with the first group of one or more wireless MTC devices on a downlink and at least one different LPN communicates with the first group of one or more wireless MTC devices on an uplink.

18. The method of claim 1, wherein:
the first LPN is part of a first group of one or more access points that communicates with the first group of one or more wireless MTC devices according to the first schedule;
the intervals of the first schedule correspond to protected subframes in which transmissions from a macro base station in the first group are at a reduced power to allow the wireless MTC devices to discover closer LPNs.

19. The method of claim 18, wherein the transmissions from the macro base station during the protected subframes are reduced to a power reduced to the same or similar transmit power used by LPNs in the first group of one or more access points.

20. The method of claim 1, wherein:
the first LPN is part of a first group of one or more LPNs that communicates with the first group of one or more wireless MTC devices according to the first schedule;
further comprising:
during association with wireless MTC devices of the first group of one or more wireless MTC devices performing joint uplink reception with other LPNs in the first group of one or more LPNs, wherein the joint uplink reception includes jointly decoding a signal from an MTC device.

21. The method of claim 20, further comprising:
receiving, during the association, from the one or more wireless MTC devices of the first group of one or more wireless MTC devices uplink transmissions having a virtual cell identification (VCID) associated with the first group of one or more LPNs.

22. The method of claim 21, further comprising:
advertising the VCID.

23. The method of claim 1, wherein:
the first LPN is part of a first group of one or more LPNs that communicates with the first group of one or more wireless MTC devices according to the first schedule;
intervals of the first schedule correspond to subframes; and
each LPN in the first group of one or more LPNs transmits a same signal as a single frequency network (SFN) transmission in one or more subframes of the first schedule.

24. The method of claim 23, further comprising:
advertising the intervals of the first schedule as multimedia broadcast single frequency network (MBSFN) subframes.

25. The method of claim 23, further comprising:
advertising the intervals of the first schedule as restricted subframes for wireless non-MTC devices.

26. The method of claim 23, further comprising:
advertising the intervals of the first schedule as MTC transmission subframes.

27. The method of claim 23, wherein:
the first group of one or more LPNs forms a first SFN area for transmitting messages to the first group of one or more wireless MTC devices; and
the first group of one or more LPNs is combined with a second group of one or more LPNs to form a second SFN area, larger than the first SFN area, for transmitting messages to a larger group of wireless devices including the first group of one or more wireless MTC devices.

28. The method of claim 27, wherein:
the first SFN area is used for transmitting unicast messages; and
the second SFN area is used for communicating broadcast messages comprising at least one of software and firmware updates.

29. An apparatus for wireless communications by a first low power node (LPN), comprising:
means for determining a first schedule of intervals for the first LPN to communicate with a first group of one or more wireless machine type communication (MTC) devices, wherein intervals of the first schedule are synchronized with wake up cycles of the first group of one or more wireless MTC devices;
means for communicating with the first group of one or more wireless MTC devices according to the first schedule, wherein the first LPN communicates using a lower transmit power than a macro base station (BS); and
means for entering a low power mode or communicating with a second group of one or more wireless non-MTC devices between the intervals.

30. The apparatus of claim 29, wherein intervals of the first schedule correspond to subframes.

31. The apparatus of claim 30, wherein a subset of the intervals of the first schedule correspond to subframes used for paging.

32. The apparatus of claim 31, wherein:
the paging is used to convey MTC system information (SI) changes, wherein the MTC SI changes are different from wireless non-MTC SI changes.

33. The apparatus of claim 31, wherein responses from a first class of wireless MTC devices for paging for earthquake and tsunami warning system/commercial mobile alert system (ETWS/CMAS) are different from responses from a second class of wireless MTC devices and wireless non-MTC devices.

34. The apparatus of claim 29, wherein:
the first LPN is part of a first group of one or more LPNs that communicates with the first group of one or more wireless MTC devices according to the first schedule; and a second group of one or more LPNs communicates with a second group of wireless MTC devices according to a second schedule of intervals, wherein intervals of the second schedule are synchronized with wake up cycles of the second group of one or more wireless MTC devices.

35. The apparatus of claim 34, wherein intervals of the first schedule and the second schedule are non-overlapping.

36. The apparatus of claim 29, wherein:
the first LPN is part of a first group of one or more LPNs that communicates with the first group of one or more wireless MTC devices according to the first schedule; and
a second group of one or more LPNs communicates with the first group of one or more wireless MTC devices according to a second schedule of intervals, different than the first schedule, wherein intervals of the second schedule are synchronized with other wake up cycles of the first group of one or more wireless MTC devices.

37. The apparatus of claim 29, wherein the first LPN is part of a first group of LPNs that:
communicates with the first group of one or more wireless MTC devices according to the first schedule; and
communicates with the second group of one or more wireless MTC devices according to a second schedule of intervals, different than the first schedule.

38. The apparatus of claim 29, wherein the first group of LPNs:
communicates with the wireless non-MTC devices using a set of channels; and
communicates with the wireless MTC devices using a subset of the set of channels.

39. The apparatus of claim 38, wherein:
at least one of a primary synchronization sequence (PSS), a secondary synchronization sequence (SSS), a physical broadcast channel (PBCH), a system information block (SIB), or paging associated with the wireless MTC devices has a larger acquisition time than for wireless non-MTC devices.

40. The apparatus of claim 39, wherein the at least one of a PSS, a SSS, a PBCH, or a SIB is transmitted on subframes allocated for communicating with the wireless MTC devices.

41. The apparatus of claim 40, wherein the at least one of a PSS, a SSS, a PBCH, or a SIB is transmitted using at least one of: different time, different frequency, different sequence, different format, different scrambling, different payload size, or different content than that used to transmit the same type of signal to wireless non-MTC devices.

42. The apparatus of claim 39, wherein the at least one of a PSS, a SSS, a PBCH, or a SIB has higher density on subframes allocated for communicating with the wireless MTC devices than on subframes allocated for communicating with wireless non-MTC devices.

43. The apparatus of claim 42, wherein the higher density is a result of at least one of repetition, bundling, or lower code rate.

44. The apparatus of claim 29, wherein:
the first LPN comprises a user equipment (UE) relay, a pico cell, an open femto cell, a remote radio head (RRH), or an MTC hub.

45. The apparatus of claim 29, wherein:
the first LPN is part of a group of LPNs that communicates with the first group of one or more wireless MTC devices according to the first schedule; and
at least one LPN in the group communicates with the first group of one or more wireless MTC devices on a downlink and at least one different LPN communicates with the first group of one or more wireless MTC devices on an uplink.

46. The apparatus of claim 29, wherein:
the first LPN is part of a first group of one or more access points that communicates with the first group of one or more MTC wireless devices according to the first schedule;
the intervals of the first schedule correspond to protected subframes in which transmissions from a macro base station in the first group are at a reduced power to allow the wireless MTC devices to discover closer LPNs.

47. The apparatus of claim 46, wherein the transmissions from the macro base station during the protected subframes are reduced to a power reduced to the same or similar transmit power used by LPNs in the first group of one or more access points.

48. The apparatus of claim 29, wherein:
the first LPN is part of a first group of one or more LPNs that communicates with the first group of one or more wireless MTC devices according to the first schedule; further comprising:
during association with wireless MTC devices of the first group of one or more wireless MTC devices, performing joint uplink reception with other LPNs in the first group of one or more LPNs, wherein the joint uplink reception includes jointly decoding a signal from an MTC device.

49. The apparatus of claim 48, further comprising:
means for receiving, during the association, from the one or more wireless MTC devices of the first group of one or more wireless MTC devices uplink transmissions having a virtual cell identification (VCID) associated with the first group of one or more LPNs.

50. The apparatus of claim 49, further comprising:
means for advertising the VCID.

51. The apparatus of claim 29, wherein:
the first LPN is part of a first group of one or more LPNs that communicates with the first group of one or more wireless MTC devices according to the first schedule;
intervals of the first schedule correspond to subframes; and
each LPN in the first group of one or more LPNs transmits a same signal as a single frequency network (SFN) transmission in one or more subframes of the first schedule.

52. The apparatus of claim 51, further comprising:
means for advertising the intervals of the first schedule as multimedia broadcast single frequency network (MBSFN) subframes.

53. The apparatus of claim 51, further comprising:
means for advertising the intervals of the first schedule as restricted subframes for wireless non-MTC devices.

54. The apparatus of claim 51, further comprising:
means for advertising the intervals of the first schedule as MTC transmission subframes.

55. The apparatus of claim 51, wherein:
the first group of one or more LPNs forms a first SFN area for transmitting messages to the first group of one or more wireless MTC devices; and
the first group of one or more LPNs is combined with a second group of one or more LPNs to form a second SFN area, larger than the first SFN area, for transmitting messages to a larger group of wireless devices including the first group of one or more wireless MTC devices.

56. The apparatus of claim 55, wherein:
the first SFN area is used for transmitting unicast messages; and
the second SFN area is used for communicating broadcast messages comprising at least one of software and firmware updates.

57. An apparatus for wireless communications by a first low power node (LPN), comprising:
at least one processor configured to:
determine a first schedule of intervals for the first LPN to communicate with a first group of one or more wireless machine type communication (MTC) devices, wherein intervals of the first schedule are synchronized with wake up cycles of the first group of one or more wireless MTC devices;
communicate with the first group of one or more wireless MTC devices according to the first schedule, wherein the first LPN communicates using a lower transmit power than a macro base station (BS); and
enter a low power mode or communicate with a second group of one or more wireless non-MTC devices between the intervals; and
a memory coupled to the at least one processor.

58. A non-transitory computer-readable medium having computer executable code stored thereon for wireless communications by a first low power node, comprising:
code for determining a first schedule of intervals for the first LPN to communicate with a first group of one or more wireless machine type communication (MTC) devices, wherein intervals of the first schedule are synchronized with wake up cycles of the first group of one or more wireless MTC devices;
code for communicating with the first group of one or more wireless MTC devices according to the first schedule, wherein the first LPN communicates using a lower transmit power than a macro base station (BS); and
code for entering a low power mode or communicating with a second group of one or more wireless non-MTC devices between the intervals.

* * * * *